July 20, 1954   L. B. YOUNG ET AL   2,684,467
IMPEDANCE BRIDGE
Filed Dec. 14, 1945
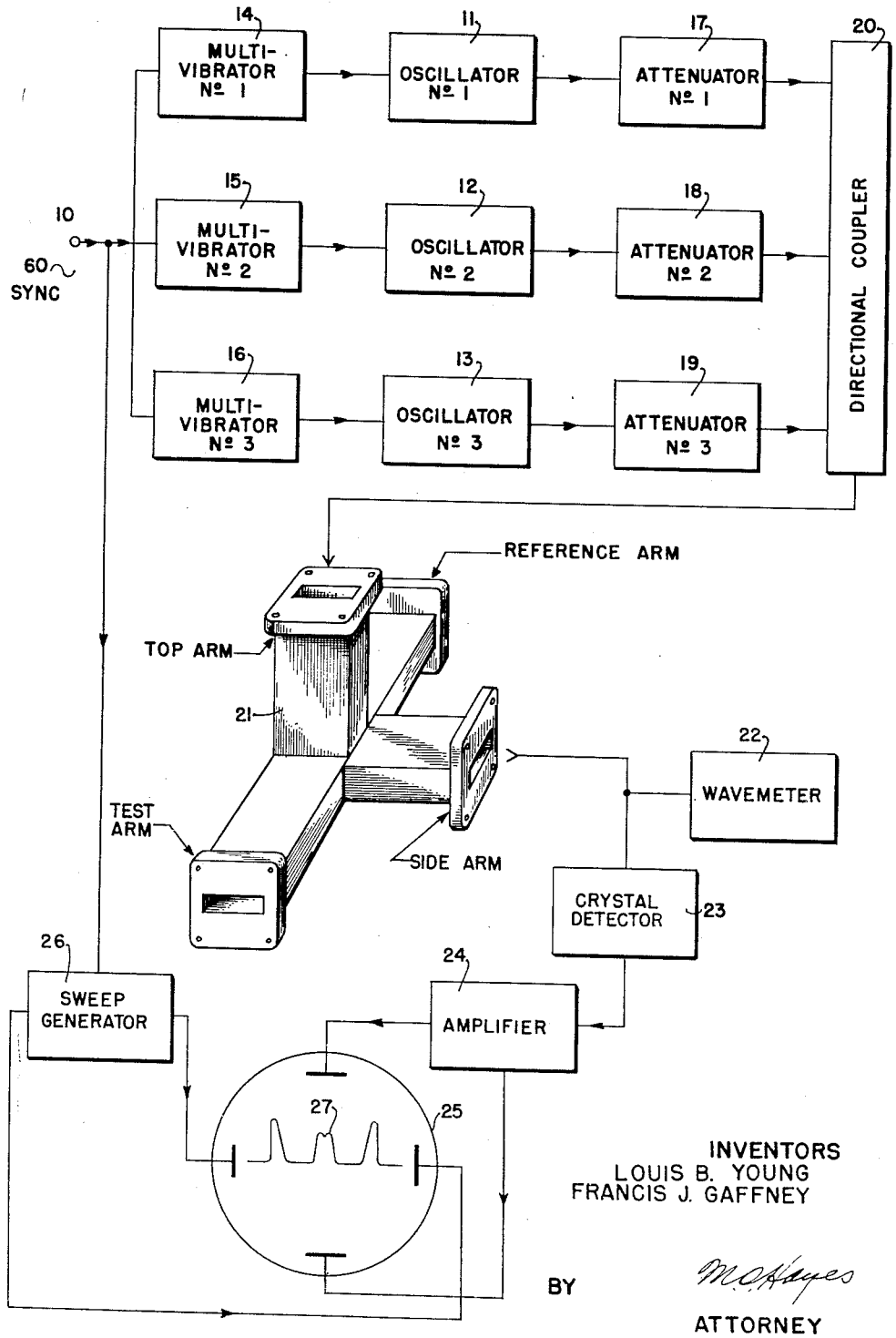
INVENTORS
LOUIS B. YOUNG
FRANCIS J. GAFFNEY
BY  M. O. Hayes
ATTORNEY Patented July 20, 1954

2,684,467

UNITED STATES PATENT OFFICE 2,684,467

IMPEDANCE BRIDGE

Louis B. Young, Cambridge, Mass., and Francis J. Gaffney, Brooklyn, N. Y., assignors to the United States of America as represented by the Secretary of the Navy Application December 14, 1945, Serial No. 635,094

7 Claims. (Cl. 324—58)

This invention relates to impedance bridges, and more particularly those used to measure the mismatch of a microwave component at a plurality of test frequencies.

The basic concept of the wave guide T-bridge as a combination of an E-plane and an H-plane T was disclosed and claimed in the copending application of Robert L. Kyhl, Serial Number 580,014, filed February 27, 1945, on "Transmission Systems," now abandoned.

In the testing of broadbanded microwave components it is desirable to be able to determine the voltage standing wave ratio of the component under test at several distinct frequencies simultaneously. Two methods are disclosed for separating the outputs at the various test frequencies. The first is a heterodyne technique, whereby a number of source oscillators are frequency modulated, and the bridge output is mixed with the output of a similar number of fixed frequency local oscillators. Each source oscillator and local oscillator pair is so tuned that a predetermined difference frequency exists at some point of the frequency sweep of the source oscillator. The source oscillators are modulated by the same sawtooth voltage that supplies the sweep deflection on a cathode ray indicator. Any difference, therefore, in the points on the frequency sweeps of the various source oscillators at which the predetermined difference frequency exists will show up as a displacement of the output signals on the sweep axis of the scope.

A second method for separating the outputs consists of amplitude modulating each of the source oscillators at a different modulating frequency. Each source oscillator operates at a fixed frequency corresponding to one of the predetermined test frequencies. The modulation may take any convenient form, i. e. pulsed or square wave, the frequency of the modulator being the basis for discrimination between the outputs at the various test frequencies.

It is the object of the present invention to provide improved apparatus for making simultaneous measurements of the voltage standing wave ratio of a component under test at several distinct frequencies.

This and other objects will be more apparent upon consideration of the following specifications, taken in connection with the accompanying drawing, the single figure of which is a block diagram of an embodiment of the invention.

A number of oscillators 11, 12 and 13, each tuned to a different test frequency, are successively pulsed into operation by multivibrators 14, 15 and 16, and the R-F pulses are applied to a side outlet T 21, herein referred to as a bridge or bridge network, in which the impedance of the microwave component under test is compared with a known or standard impedance. The amplitude of the pulses at the side arm T output will correspond to the unknown mismatch of the component at the various test frequencies. These output pulses are detected at 23 and presented on a scope 25 as vertical deflections of the beam.

Considering the circuit in greater detail, a 60-cycle synchronizing voltage, applied at terminal 10, is used to turn on multivibrators 14, 15 and 16 in succession. Each multivibrator is turned on at a different point in the cycle of the synchronizing voltage, depending on the bias setting of the particular multivibrator.

The circuit constants of the multivibrators are such that, upon being turned on, each will produce a narrow positive gate, the duration of the gate in the present instance being approximately 100 microseconds. The successive gates from multivibrators 14, 15 and 16 are applied respectively to oscillators 11, 12 and 13. Any type of oscillator capable of being gated on and off can be used. Attenuators 17, 18 and 19 interposed between the oscillators and a common transmission line, permit adjustment of the signal impressed on bridge network 21. The output attenuated pulses are coupled into the common transmission line by a three-gang directional coupler 20, this coupler serving to decouple the oscillators. As used herein, a side outlet T functions as the bridge network. The reference arm of bridge 21 is terminated in a matched load, and the component to be tested is connected to the test arm. Pulses from the oscillators are applied to the top arm (E-arm) and the output is taken from the side arm (H-arm). The power transmitted through the bridge at any moment is a function of the power supplied to the bridge and the mismatch of the component under test at the frequency of the applied power. The functions of the arms labeled "top arm" and "side arm" can be interchanged without altering the operation.

The microwave pulses appearing at the bridge output flow past wavemeter 22 and into crystal detector 23. The detector output signal is amplified at 24 and applied to the vertical plates of cathode ray tube 25 to deflect the cathode ray beam.

A horizontal sweep voltage is produced in sweep generator 26 for each cycle of the same 60 cycle synchronizing source which energizes the multivibrators in succession. There appears, therefore, on the screen of cathode ray tube 25, a standing pattern of the output pulses from the bridge, each pulse or pip representing the degree of mismatch at one of the test frequencies. If reaction type wavemeter 22 is adjusted so that a particular pip is distorted, as shown for example at 27, the wavemeter will read the test frequency represented by that pip. By connecting an adjustable calibrated termination or a known impedance to the test arm, it is possible to obtain a reference level and/or calibration lines on the screen, which, for a given setting of the attenuators, will provide a basis for production testing of components such as attenuators, antennas, thermistor mounts, duplexers, directional couplers, rotating joints and other such items.

Generalizing the description, the invention is not, of course, limited to any frequency band of any number of oscillators, nor to any particular synchronizing frequency. The distinguishing feature of this test set is that the oscillators are amplitude modulated, the amplitude peaks being separated in time during the sweep cycle. The outputs of the oscillators may be combined by any means and applied to a bridge, where a test impedance is compared with a reference match, and then applied to a wavemeter, detector, and amplifier. The resulting output signals are applied to an indicating system, a cathode ray tube being a convenient form of indication.

It is believed that the construction and operation of my invention, as well as the advantages thereof, will be apparent from the foregoing description. It will be understood that while I have shown and described my invention in a particular embodiment, changes may be made in the circuits disclosed without departing from the invention, as sought to be defined in the following claims.

We claim:

1. An impedance bridge comprising, a standard impedance, an unknown impedance, a plurality of oscillators differing in frequency, a source of periodically varying synchronizing voltage, a plurality of pulse generators triggered by said synchronizing voltage to produce an output pulse, each of said pulse generators being biased to respond at a different amplitude of said synchronizing voltage whereby a time sequence of output pulses is produced, means for pulse modulating said oscillators in time sequence with the output of said pulse generators to produce a time sequence of test frequencies, means for coupling said standard impedance and said unknown impedance in a bridge network, means energizing said bridge from said plurality of oscillators, means for detecting bridge unbalance, and means for indicating the output of said detector.

2. A microwave impedance bridge comprising, a standard reference microwave circuit component, a microwave circuit component having unknown characteristics, a plurality of microwave oscillators differing in frequency, a source of periodically varying synchronizing voltage, a plurality of multivibrators activated by said synchronizing voltage to produce output pulses, each of said multivibrators being biased to respond at a different amplitude of said synchronizing voltage whereby a time sequence of output pulses is produced, means for pulse modulating said microwave oscillators in time sequence with the output of said multivibrators to produce a time sequence of test frequencies, a plurality of microwave elements coupling said reference component and said unkown component together in a wave guide T-junction impedance bridge, means for energizing said bridge from said plurality of microwave oscillators, means for detecting bridge unbalance and means for indicating the output of said detector.

3. A multifrequency microwave impedance bridge comprising, a standard reference microwave circuit component, a microwave circuit component having unknown characteristics, a plurality of microwave oscillators differing in frequency, a source of periodically varying synchronizing voltage, a plurality of multivibrators activated by said synchronizing voltage to produce output pulses, each of said multivibrators being biased to respond at a different amplitude of said synchronizing voltage whereby a time sequence of output pulses is produced, means for pulse modulating said microwave oscillators in time sequence with the output of said multivibrators to produce a time sequence of test frequencies, a plurality of microwave elements coupling said reference component and said unknown component together in a wave guide T-junction impedance bridge, means for energizing said bridge from said plurality of microwave oscillators, means for detecting bridge unbalance, a generator of sweep voltages, a cathode ray indicator tube, means for applying voltage from said source of synchronizing voltage to energize said sweep generator in synchronism with the timed sequence of test frequencies, means applying the output of said sweep generator to said cathode ray tube to provide a sweep excursion of the cathode ray beam, and means applying the output of said detector to said cathode ray tube to deflect said beam from said sweep excursion.

4. A pulse modulated multifrequency impedance bridge comprising, an unknown impedance element, a bridge circuit, said impedance element forming one arm of said bridge, a plurality of oscillators differing in frequency, means for energizing said oscillators periodically in time sequence whereby a time sequence of test frequency pulses are produced, means for energizing said bridge with the outputs of said oscillators, means for detecting bridge unbalance, and means for indicating the output of said detecting means.

5. A pulse modulated multifrequency impedance bridge comprising four wave guide arms of substantially the same impedance connected together at a common junction point, two of said arms being aligned, the remaining two of said arms being perpendicular to one another and to said aligned arms, a known impedance coupled to one of said aligned arms, an unknown impedance coupled to the other of said aligned arms, a plurality of oscillators, each generating a series of regularly recurring pulses of radio frequency energy at a predetermined frequency, means for synchronizing the operation of said oscillators to produce a time sequence of test frequencies, means for coupling said oscillators to a common transmission line, means coupling said line to one of said remaining two arms, and means coupled to the other of said remaining two arms for indicating the amplitude of signals passed by said aligned arms.

6. A pulse modulated multifrequency impedance bridge comprising four wave guide arms of substantially the same impedance connected together at a common junction point, two of said arms being aligned, the remaining two of said arms being perpendicular to one another and to said aligned arms, a known impedance coupled to one of said aligned arms, an unknown impedance coupled to the other of said aligned arms, a plurality of oscillators, each generating a series of regularly recurring pulses of radio frequency energy at a predetermined frequency, means for synchronizing the operation of said oscillators to produce a time sequence of test frequencies, means for coupling said oscillators to a common transmission line, means coupling said line to one of said remaining two arms, means coupled to the other of said remaining two arms for detecting bridge unbalance, and means for indicating the output of said detecting means.

7. A pulse modulated multifrequency impedance bridge comprising four wave guide arms of substantially the same impedance connected together at a common junction point, two of said arms being aligned, the remaining two of said arms being perpendicular to one another and to said aligned arms, a known impedance coupled to one of said aligned arms, an unknown impedance coupled to the other of said aligned arms, a plurality of oscillators, each generating a series of regularly recurring pulses of radio frequency energy at a predetermined frequency, means for synchronizing the operation of said oscillators to produce a time sequence of test frequencies, means for coupling said oscillators to a common transmission line, means coupling said line to one of said remaining arms, and means coupled to the other of said remaining two arms for detecting bridge unbalance, a cathode ray indicator, a generator of sweep voltages, means for applying a voltage from said source of synchronizing voltage to energize said sweep generator in synchronism with the timed sequence of test frequencies, means applying the output of said sweep generator to said cathode ray tube to provide a sweep excursion of the cathode ray beam, and means applying the output of said detector to said cathode ray tube to deflect said beam from said sweep excursion.

References Cited in the file of this patent
UNITED STATES PATENTS

| Number | Name | Date |
|---|---|---|
| 1,665,325 | Peterson | Apr. 10, 1928 |
| 1,816,958 | Clark et al. | Aug. 4, 1931 |
| 2,200,819 | Bohannon | May 14, 1940 |
| 2,243,234 | Von Duhn | May 27, 1941 |
| 2,369,662 | Deloraine et al | Feb. 20, 1945 |
| 2,416,790 | Barrow | Mar. 4, 1947 |
| 2,437,449 | Ames et al. | Mar. 9, 1948 |
| 2,448,336 | Weiner | Aug. 31, 1948 |
| 2,461,456 | Usselman | Feb. 8, 1949 |